United States Patent [19]

Baldwin et al.

[11] Patent Number: 5,444,230
[45] Date of Patent: Aug. 22, 1995

[54] SOLID STATE OPTICAL READER WITH BI-DIRECTIONAL PROTOCOL

[75] Inventors: Dwight G. Baldwin, Austin; James K. Kennedy, Round Rock; Steven G. Saxe, Round Rock, all of Tex.

[73] Assignee: Minnesota Mining and Manufacturing Company, St. Paul, Minn.

[21] Appl. No.: 159,734

[22] Filed: Nov. 30, 1993

[51] Int. Cl.⁶ .............................................. G06K 7/10
[52] U.S. Cl. .................................... 235/462; 235/454
[58] Field of Search ............... 235/462, 472, 454, 456, 235/469, 380

[56] References Cited

U.S. PATENT DOCUMENTS

| | | | |
|---|---|---|---|
| 2,633,655 | 8/1945 | Langan | 40/158 |
| 3,839,625 | 10/1974 | Chadima, Jr. et al. | 235/61.12 |
| 4,542,528 | 9/1985 | Samer et al. | 235/462 X |
| 4,644,143 | 2/1987 | McJohnson et al. | 235/462 |
| 4,652,731 | 3/1987 | Chautemps et al. | 235/462 |
| 4,801,788 | 1/1989 | Osaka | 235/462 |
| 4,870,604 | 9/1989 | Tatsumo | 235/380 X |
| 4,882,473 | 11/1989 | Bengenow et al. | 235/380 |
| 4,935,608 | 6/1990 | Tanaka | 235/380 |
| 4,963,726 | 10/1990 | Chechetti | 235/454 X |
| 4,994,987 | 2/1991 | Baldwin | 364/518 |
| 5,001,696 | 3/1991 | Baldwin | 364/521 |
| 5,053,612 | 10/1991 | Pielemeier et al. | 235/462 |
| 5,081,364 | 1/1991 | Wike, Jr. | 250/555 |
| 5,105,070 | 4/1992 | Wike, Jr. et al. | 235/467 |
| 5,118,930 | 6/1992 | Takada | 235/462 |
| 5,135,160 | 8/1992 | Tasaki | 235/462 |
| 5,184,005 | 2/1993 | Ukai et al. | 235/472 |
| 5,185,514 | 2/1993 | Wike, Jr. et al. | 235/472 |
| 5,192,856 | 3/1993 | Schaham | 235/462 |
| 5,196,684 | 3/1993 | Lum et al. | 235/462 |
| 5,210,398 | 5/1993 | Metlitsky | 235/462 |
| 5,216,523 | 6/1993 | Kawanowa et al. | 358/471 |
| 5,218,192 | 6/1993 | Fujii et al. | 235/487 |
| 5,233,171 | 8/1993 | Baldwin | 235/467 |

FOREIGN PATENT DOCUMENTS

| | | | |
|---|---|---|---|
| 550271 | 7/1993 | European Pat. Off. | 235/462 |
| 551984 | 7/1993 | European Pat. Off. | 235/462 |
| 9100238 | 9/1992 | Netherlands | 235/462 |
| 9102023 | 7/1993 | Netherlands | 235/462 |
| 2206716 | 7/1987 | United Kingdom | 205/462 |

OTHER PUBLICATIONS

IBM Technical Bulletin, "Mark/Sensing with Transmitted Light" Hammer et al. Jun. 1958, vol. 1, No. 1.

*Primary Examiner*—Donald T. Hajec
*Assistant Examiner*—Thien Minh Le
*Attorney, Agent, or Firm*—Gary L. Griswold; Walter N. Kirn; Jack V. Musgrove

[57] ABSTRACT

An apparatus for reading an optical bar code on a transparent film uses a linear array of light sources and a linear, solid-state sensor located parallel with array. LED's are energized selectively in groups to avoid overlapping shadows on the sensor. A novel algorithm is used to reconstruct the shadowgraphs or image segments by searching for a transition (mark/space edge in the bar code) in an overlap zone at the boundary of adjacent segments on the sensor. Conventional techniques are then used to decode the reconstructed electronic image of the bar code. The apparatus is particularly useful in an electronic presentation system wherein the numeric value of the bar code is an image reference number (IRN) which is used to access a host computer and display a graphic image associated with the IRN. A novel bi-directional protocol is also presented for providing communications between the optical reader and the host computer. The protocol directs the host computer to download all IRN's for a given presentation to the reader. The reader can then locally determine if a bar code on a card corresponds to a valid IRN in the current presentation. The protocol may be adapted to download certain display control information and send associated control signals to the host computer based on keyboard input at the reader.

20 Claims, 7 Drawing Sheets

SOLID STATE OPTICAL READER WITH BI-DIRECTIONAL PROTOCOL

BACKGROUND OF THE INVENTION

1. Field of the Invention

The present invention generally relates to optical scanning devices, and more particularly to a novel device and technique for reading bar codes on a transparent substrate using solid state components.

2. Description of the Prior Art

The present invention is directed to certain improvements on the Image Access System (IAS) electronic presentation system for displaying stored images, as disclosed in U.S. Pat. Nos. 4,994,987, 5,001,696 and 5,233,171, and in U.S. patent application Ser. No. 07/861,067. The terms "Image Access System" and "IAS" are trademarks of Minnesota Mining and Manufacturing Co. (3M—assignee of the present invention).

The IAS presentation system requires a substrate, such as a preview card, which contains human-readable information (an illustration or textual description) associated with a stored image, and machine-readable information associated with the location of the stored image, e.g., a software address on a medium separate from the card, such as a computer diskette. One embodiment of the IAS system includes a card reader which supports the card in such manner that it may be viewed by the user and simultaneously scanned by the reader to allow decryption of the machine-readable information. In each of the three embodiments of the preview cards described in U.S. Pat. No. 5,001,696, the machine-readable information (bar code) has an opaque background (the white paper card) and is designed to be read using a reflective (or retroreflective) scanning technique. For example, in U.S. Pat. No. 5,233,171, the card reader uses the same optical path (inside the reader) for emitting the light beam and for collecting the reflected signals. See also U.S. Pat. Nos. 4,644,143 and 5,053,612 and European Patent Application No. 550,271, which show bar code readers requiring complicated constructions using beam splitters, mirrors and lenses to create folded optical paths. Hand-held scanners having similar folded optical paths are disclosed in U.S. Pat. Nos. 5,184,005, 5,192,856, 5,210,398 and 5,216,523. Reference is also made to the publications cited in the above-mentioned IAS patents and application.

The use of retroreflective collection techniques, in particular, imparts several advantages, such as minimizing reception of erroneous specular reflections. Unfortunately, however, the use of reflective (and retroreflective) scanning techniques or a folded optical path generally requires more space in the reader, detracting from the desideratum of compactness, which enhances the reader's portability. Reflective techniques also require a relatively high intensity (radiance) light source (e.g., a laser or laser diodes) since there is never 100% reflection of the beam and some scattering always occurs. It would, therefore, be desirable to devise a bar code reader which uses transmissive collections techniques, rather than reflective, in order to simplify the optical geometry of the reader and eliminate the need for high-intensity light sources. It would be further advantageous if the reader included a two-way communications protocol to facilitate the transmission of the optically encoded data to a host system, such as a computer which displays the electronically stored images associated with the optically encoded data, and to provide feedback from the host computer with respect to the current presentation status.

SUMMARY OF THE INVENTION

The present invention provides an apparatus for reading an optical bar code on a transparent portion of a substrate, the apparatus comprising a housing, a linear optical sensor located in the housing, a linear array of point light sources located in the housing and mounted parallel to the sensor, each of the light sources having an optical axis directed toward the sensor, a slot formed in the housing to removably retain the substrate with the transparent portion thereof located between the array of light sources and the optical sensor, and a microcontroller for processing electrical signals from the optical sensor to produce an output signal corresponding to the optical bar code. In the preferred embodiment, the substrate is a preview card having a transparent film window, and the sensor is a solid-state MOS device.

The light sources are preferably grouped into a plurality of banks, a given bank having only light sources which are non-adjacent to other light sources in that bank, and the banks are sequentially energized such that, when a particular light source is energized, any light source adjacent to said particular light source is not energized. This prevents overlapping shadowgraphs of the bar code on the sensor which would lead to erroneous readings. The processor electronically generates multiple image segments based on the electrical signals from the optical sensor, one image segment for each of the light sources, and then combines the multiple image segments to reconstruct an electronic image corresponding to the entire optical code. Thereafter, the reconstructed electronic image is decoded to yield the output signal (an image reference number or IRN used to access a graphic image stored on or otherwise accessed by a host device).

The host device may have electronically stored information, associated with the IRN, which relates to the visual presentation of the graphic image. Such presentation information may include a reveal count indicating the number of image sequences associated with a particular image. The reader accordingly includes a keyboard which allows the user to transmit one or more display control signals, associated with the presentation information, to the host device.

A novel bi-directional protocol is used to pass information between the reader and the host device. The protocol assumes the IRN's are embedded in one or more electronic data segments stored on the host device. The reader first issues a request to the host device for a value from which the number of data segments to be downloaded may be calculated, and then successively requests each of the data segments, which are downloaded into the reader's memory (EEPROM). The processor creates an electronic index having a plurality of index numbers associated, respectively, with the IRN's in the data segments and, when a bar code on a card properly corresponds to one of the IRN's, the associated index number is sent to the host device. Thereafter, the host device is intermittently polled for a host status response, the polling signal including any of the aforementioned control signals.

The communications between the reader and the host device may be wireless. Annunciators are used to indicate various error conditions, such as an invalid card (bad bar code), an IRN which is not included in the presentation currently loaded on the host device, a failure in communications with the host device, or a low battery.

BRIEF DESCRIPTION OF THE DRAWINGS

The invention will best be understood by reference to the accompanying drawings, wherein.

DESCRIPTION OF THE PREFERRED EMBODIMENT

The present invention is particularly suited for use with the Image Access System (IAS) presentation system disclosed in U.S. Pat. Nos. 4,994,987, 5,001,696 and 5,233,171, and in U.S. patent application Ser. No. 07/861,067, each of which is incorporated by reference. The IAS system uses preview cards which have, among other things, machine-readable information thereon, associated with the location of stored images which may be retrieved and displayed electronically. The presently preferred embodiment contemplates the use of an optical bar code placed on a transparent window in the preview card, the encoded information being indicative of the address on a computer diskette where the image is magnetically or optically stored. The encoded information may also be used to access additional information associated with the image, such as the revelation images discussed further below.

Figures 1, 3:
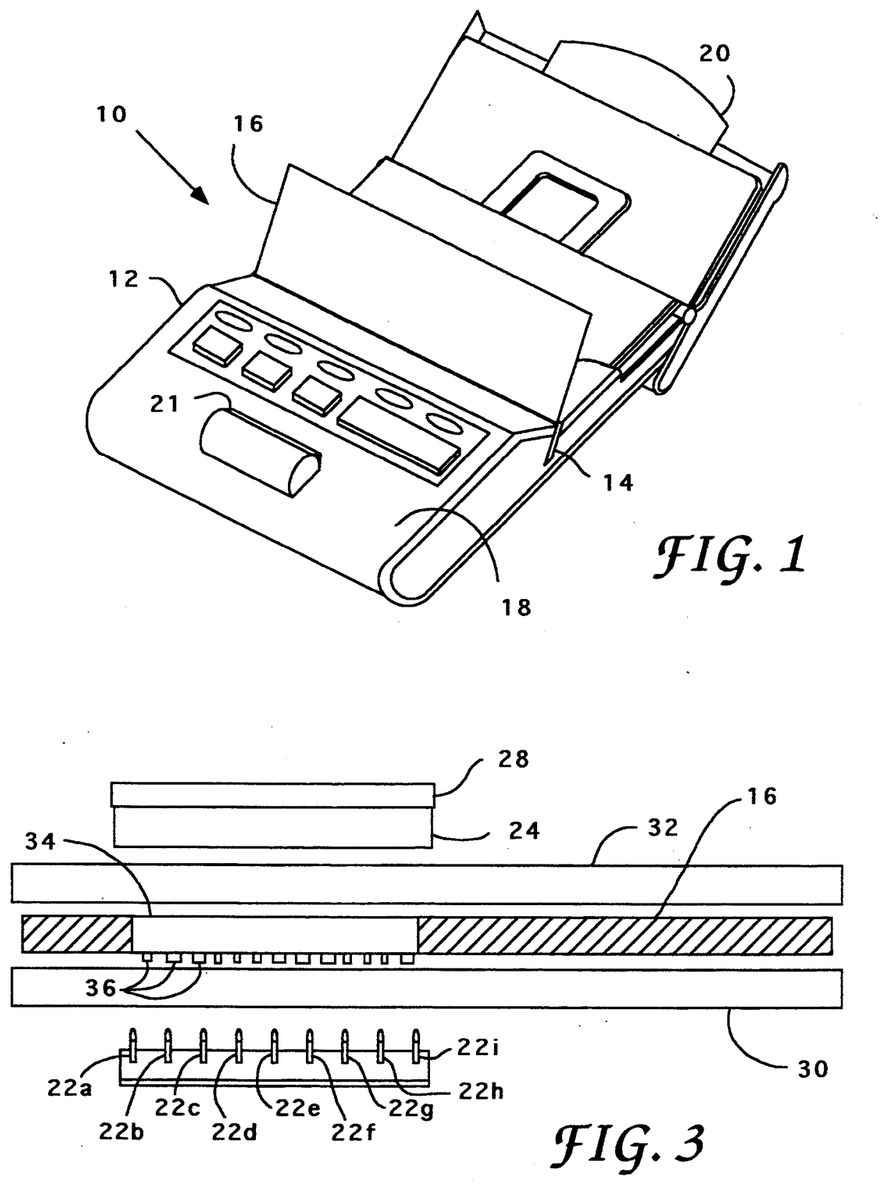
FIG. 1 is a perspective view of one embodiment of the optical reader of the present invention.
FIG. 3 is a fragmentary top plan view of the reader of FIG. 1 depicting the optical components thereof.

With reference now to the figures, and in particular with reference to FIG. 1, there is depicted one embodiment 10 of the optical reader of the present invention. Reader 10 is generally comprised of a body 12 having a slot 14 therein to receive the lower portion of a preview card 16. The upper surface of body 12 has a keyboard 18, discussed further below in conjunction with FIG. 7. There is also a console or panel 20 with several annunciators used to indicate error conditions. A small light source 21 is used to illuminate keyboard 18 and card 16 when placed in slot 14 in case the presentation environment is dark. Other light sources not shown in FIG. 1 may similarly be used to illuminate the cards when retained in the preview and discard locations on reader 10. The physical construction and external appearance of reader 10 is discussed more fully U.S. patent application Ser. No. 08/147,831 filed on or about Nov. 9, 1993. Details of the preview card are more fully disclosed in U.S. patent application Ser. No. 08/148,511 filed on or about Nov. 9, 1993. The present invention is not directed to the external form of the reader nor to the preview cards, but is rather directed to the opto-electronic aspects of the reader. Accordingly, those skilled in the art will appreciate that the optical and electronic components of reader 10 as hereinafter claimed may be used in applications other than electronic presentation systems.

Figure 2:
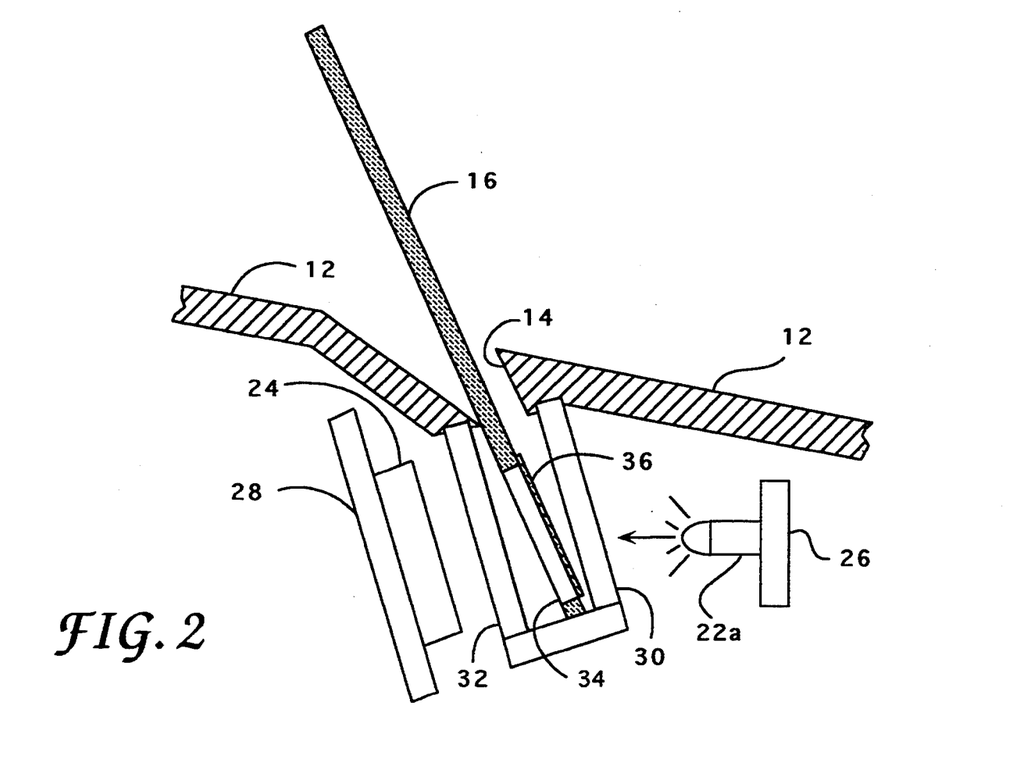
FIG. 2 is a fragmentary sectional view of the reader of FIG. 1 depicting the optical components thereof.

Referring now to FIGS. 2 and 3, the basic optical components of reader 10 include an array of light sources 22a-22i and an optical sensor 24 located on either side of slot 14. Light sources 22a-22i are mounted on a substrate 26 such as a printed circuit board, and sensor 24 is mounted on a similar substrate 28. Two clear plates 30 and 32 (acrylic) are used to protect the optical components and to support card 16, which has an optical code, e.g., a bar code, printed on a transparent window 34. The bar code (discussed further below) comprises a series of opaque marks 36. Marks 36 are shown (exaggerated) as being printed on the side of card 16 closest to light sources 22a-22i. With this construction, light from sources 22a-22i strikes the transparent window 34 of card 16 and casts a shadow of the marks 36 onto sensor 24.

Use of a transparent substrate for the bar code eliminates certain moving parts, such as a scanning mirror. The use of multiple LED's imparts other advantages, including a shorter optical path which allows reader 10 to be more compact in size. The transmissive optical path through window 34 also allows the use of relatively low-intensity light sources, such as light-emitting diodes (LED's), as opposed to the use of a laser or laser diodes, thereby reducing the cost of reader 10. Suitable LED's include those available from Stanley Electric Co. of Battle Creek, Mich., under part no. DN1102W. As depicted, the LED's form a generally linear array which is parallel to sensor 24. Each of the LED's approximates a point source of light and has an optical axis, all of the axes being generally parallel to each other. Accordingly, sensor 24 extends generally perpendicular to the optical axes of the LED's, although the surface of sensor 24 is tilted at about a 45° angle with respect to the optical axes. An array of linear light sources (not shown) could alternatively be used as long as they extended in a direction which was generally parallel to the marks of the bar code when card 16 rests in slot 14. Sensor 24, which is also generally linear, is preferably solid-state, such as the metal-oxide semiconducting (MOS) sensor sold by Texas Instruments of Dallas, Tex., under part no. TSL227. This sensor has 512 individual pixels which may be analyzed, as discussed below, to reconstruct an electronic image of the bar code. Of course, an array of several sensors would be equivalent to the single disclosed sensor. A charge-coupled device (CCD) could be used instead of a MOS sensor, although this might require additional optical components. The LED array and sensor 24 are mounted at a predetermined location within body 12 of reader 10 based on the presumed geometry of card 16, i.e., based on the location of transparent window 34 at the lower portion of card 16. The disclosed construction may be modified to include other optical components. For example, lenses could be provided for each LED to increase the intensity of the light at sensor 24, shortening the read cycle due to the integration time of the sensor, and reducing the reader's sensitivity to ambient light. One or more mirrors could also be provided to help direct the light from the LED's through the window of card 16, or from the window to sensor 24.

It will be appreciated that the term "transparent" as used herein, while generally referring to the visible spectrum, may also refer to other portions of the electromagnetic spectrum, such as infrared or ultraviolet, and so should not be construed in a limiting sense. Indeed, in the preferred embodiment of reader 10, the LED's emit infrared light and sensor 24 is responsive to such light.

Figure 4:
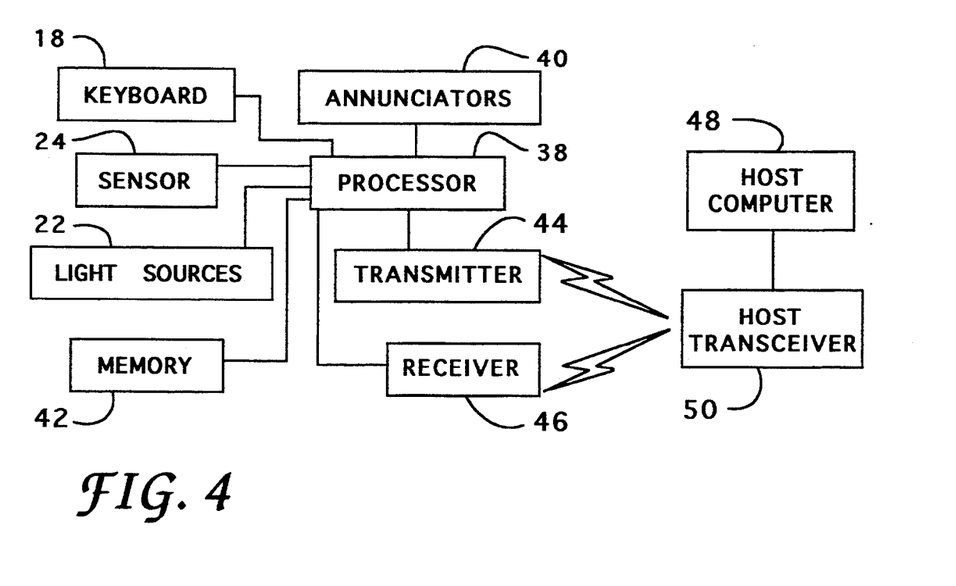
FIG. 4 is a block diagram of the electronic components of the reader of the present invention.

FIG. 4 schematically illustrates the electronic components of reader 10, including a processor 38 electronically connected to light sources 22, sensor 24, keyboard 18, and also connected to annunciators 40 on panel 20, electronic memory 42, a wireless transmitter 44 and a wireless receiver 46. As explained further below, transmitter 44 and receiver 46 provide communications with a host computer 48 via a wireless host transceiver 50. Processor 38 includes several conventional elements (not depicted), such as an internal clock, comparators, etc. The presently preferred embodiment uses the MC68HC705C8S microcontroller available from Motorola Inc. of Schaumberg, Ill. A communications port (copper connector—not shown) may be provided to allow wired connection to the host device. An RS232 port and associated converter (not shown) may also be provided for debugging purposes. Memory 42 is preferably in the form of an electrically-erasable, programmable read-only memory (EEPROM), and is used to temporarily store data downloaded from host computer 48. Transmitter 44 and receiver 46 may use any wireless technology, such as ultrasound or radio waves, but they preferably use conventional infrared LED's and infrared sensors, respectively. The receiver may be that available from Sharp Corp. of Osaka, Japan. All of the components may be powered by batteries (not shown) within body 12 of reader 10, or an adapter may be used to convert a standard power supply (e.g., 110 volts AC) to DC voltage. Host transceiver 50 may comprise a conventional full-duplex receiver but, in the preferred embodiment, it is an intelligent half-duplex receiver.

Figure 5A:
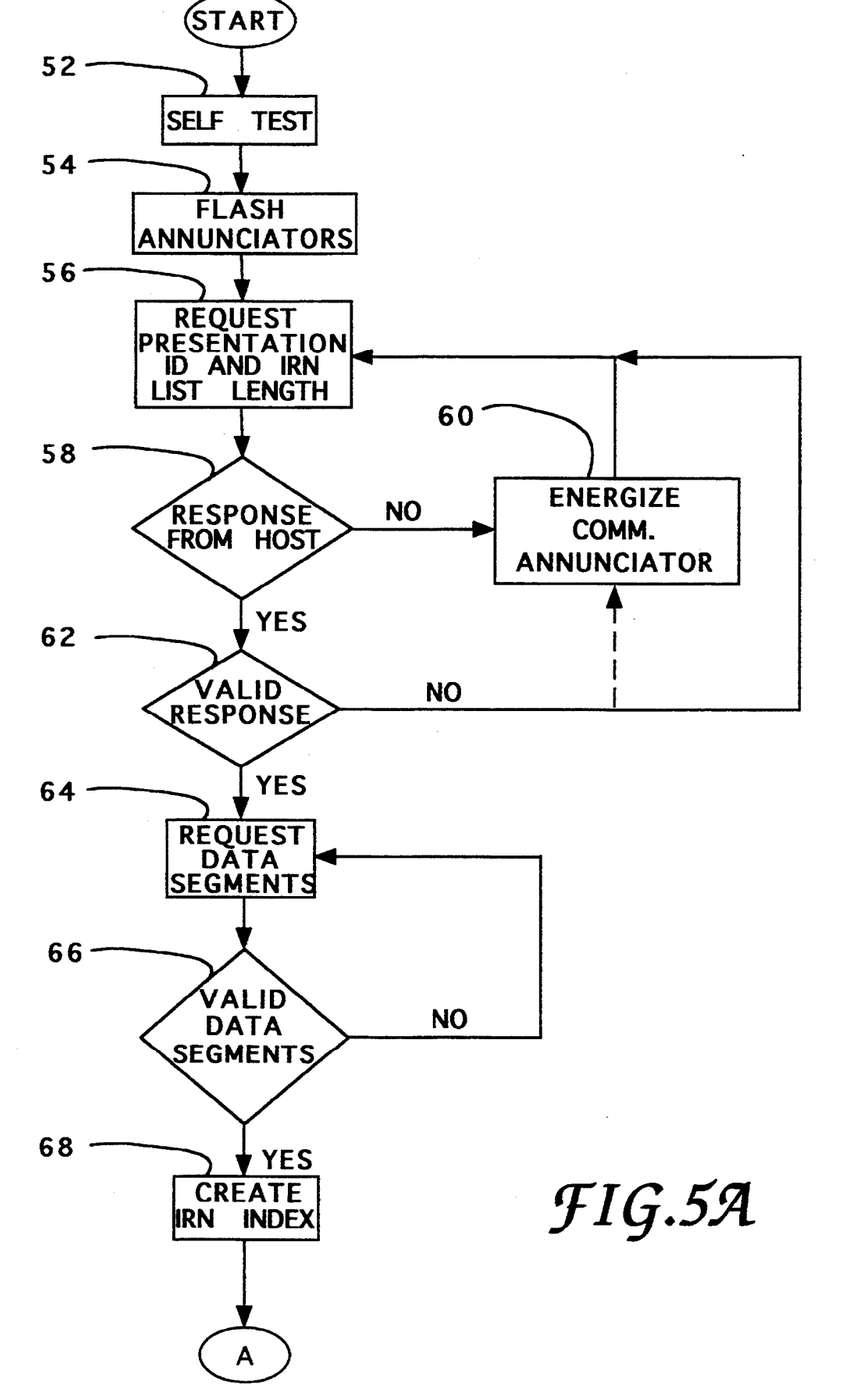
FIGS. 5A-5B are a flow chart illustrating the reader's operation as controlled by its processor.
Figure 5B:
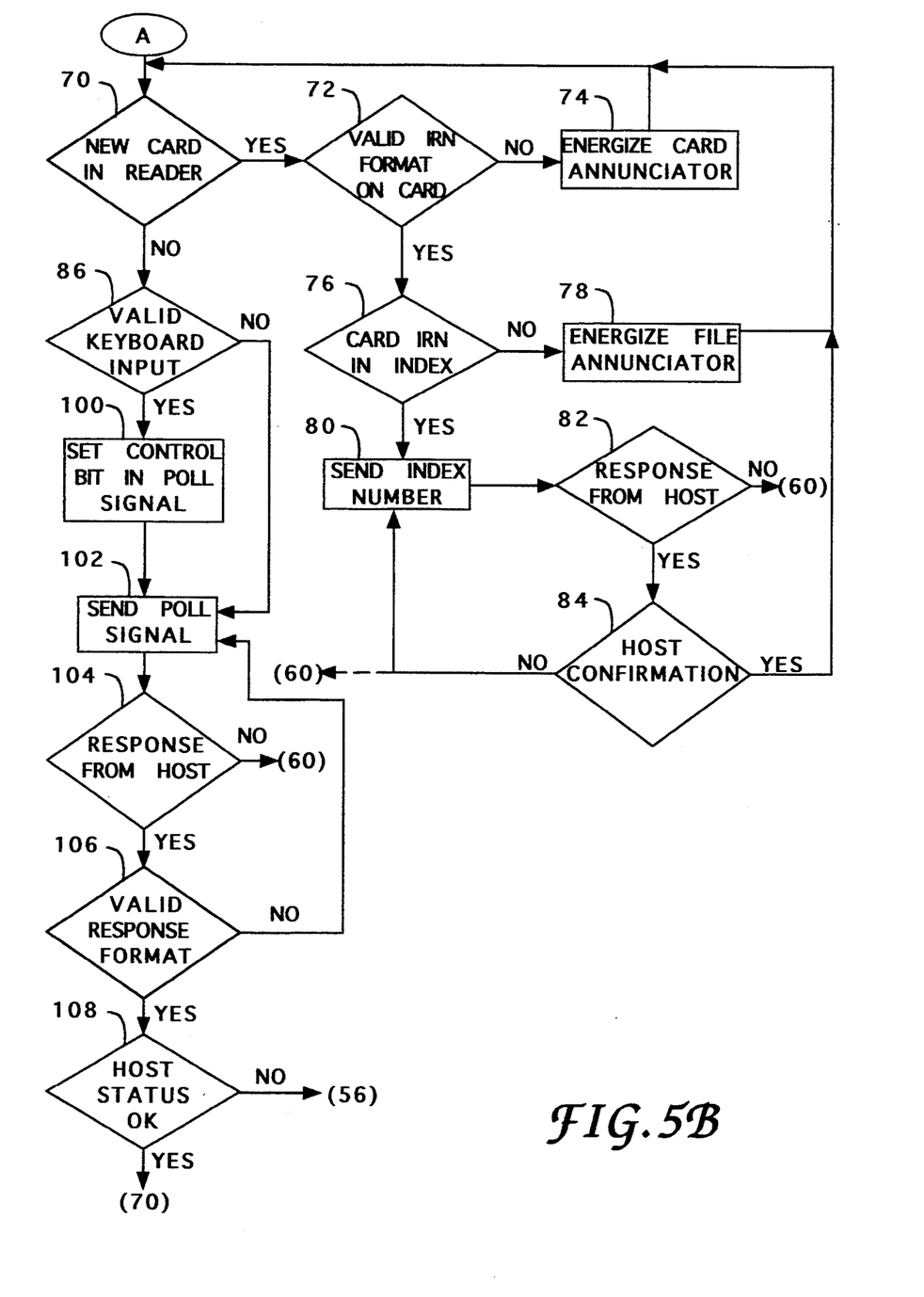
Figure 6:
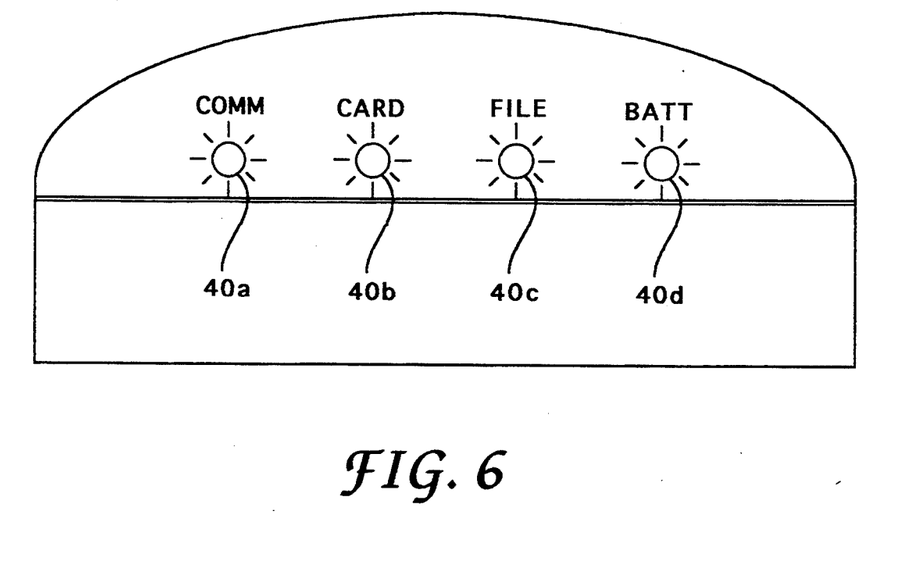
FIG. 6 is a front elevational view of the annunciator panel of the reader of FIG. 1.

Processor 38 also includes an internal memory unit, such as an additional EPROM (not shown), for storing program instructions associated with operation of reader 10. The program instructions may best be understood with reference to the flow chart of FIG. 5. When power to reader 10 is first turned on, the reader performs a self test (52), and successively illuminates each of the annunciators 40 on panel 20, allowing the user to confirm that each of the annunciators is working properly (54). As shown in FIG. 6, the presently preferred embodiment includes a communications annunciator 40a ("COMM"), a card annunciator 40b ("CARD"), a file annunciator 40c ("FILE") and a battery annunciator 40d ("BATT"). The first three of these annunciators are explained further below. The latter annunciator is illuminated by processor 38 whenever the battery power falls below a predetermined threshold.

If the self test passes, processor 38 issues a request to transmitter 44 for a presentation identification (PID) number, and for the number of data segments to be downloaded, also referred to as the IRN list length (56); these two values may be requested simultaneously or successively. The PID number is arbitrary, and may be the checksum of all bits in each of the data segments. Each data segment (created by host computer 48) has a sufficient length to hold several of the image reference numbers (IRN's) which are uniquely associated with each graphic image to be displayed. In the preferred embodiment, each data segment is 64 bytes, and each IRN is a four-byte numeric value, with a trailing fifth byte used for special display codes (e.g., the reveal/hide feature as explained further below). Of course, the data segments could be any size, including the minimum size of five bytes, corresponding to a single IRN. Rather than downloading the actual number of data segments, the number of IRN's (separate images in the presentation) may be downloaded, and processor 38 then determines the number of data segments required for the download based on the aforementioned sizes of the data segments and IRN's.

After requesting the PID and IRN list length, processor 38 activates receiver 46 to analyze any response from the host (58). If no response is received after a predetermined time, communications annunciator 40a is energized to indicate a communications failure (60). Processor 38 may cause annunciator 40a to blink during the predetermined time, indicating a potential communications failure, the annunciator being continually energized only after the predetermined time. Annunciator 40a may be initially energized after the self-test to assume a communications failure upon startup of reader 10 until a positive response is received. The host may respond with a not-acknowledged command (NAK), in which case the request for the presentation ID and number of data segments is repeated (62); after a predetermined number of repeated NAK's, "COMM" annunciator 40a may be energized. Otherwise, if a valid response is received (based on a predetermined format), the processor issues multiple requests to transmitter 44 for the data segments, one such request for each segment indicated in the IRN list length (64); communications annunciator 40a is extinguished. After each data segment request, receiver 46 is activated and processor 38 analyzes each segment response to determine if it is valid, again based on a predetermined format and any checksum that may be incorporated into the data segments (66). If any segment is invalid, the segment request is repeated; all valid segments are placed in memory 42.

As the IRN list is downloaded, processor 38 creates an electronic index of the IRN's, e.g., the first IRN is associated with index number 1, the second IRN in the list is associated with index number 2, etc. These index numbers are likewise previously calculated by host computer 48, and are used to simplify communications, i.e., processor 38 need only send the shorter (1 byte) index number than the longer (4 byte) IRN, to select a given graphic image; of course, the actual IRN could still be sent. Thereafter, processor 38 checks to see if a new card has been placed in the reader (70). If so, the card is checked to see if a bar code with the proper format is present (72); these two steps are discussed at length in conjunction with FIGS. 8 and 9. If no valid IRN is found, annunciator 40b is energized (74). If a valid IRN is found, it is compared against all IRN's in the IRN list (76) to confirm that the particular card placed in the reader is one properly associated with the particular presentation information loaded on host computer 48. If the card's IRN is not found in the downloaded IRN list, annunciator 40c is energized (78). Annunciators 40b and 40c are de-energized when card 16 is removed from slot 14, or if there is a communications failure (60). If the IRN is found in the list (80), its corresponding index number is sent to transmitter 44, and its fifth-byte display code is loaded in the processor's internal memory. Host computer 48 confirms the IRN (and its validity) by returning the index number to receiver 46. If no response is received (82), or if a predetermined number of such response failures occurs, program flow moves back to step 60. Host computer 48 may also respond with a NAK, in which case the IRN index number is re-sent (84), although the number of such retries is preferably limited. When the index number is received by host computer 48, it determines the location of the stored graphic image, and accesses the image for display.

Figure 7:
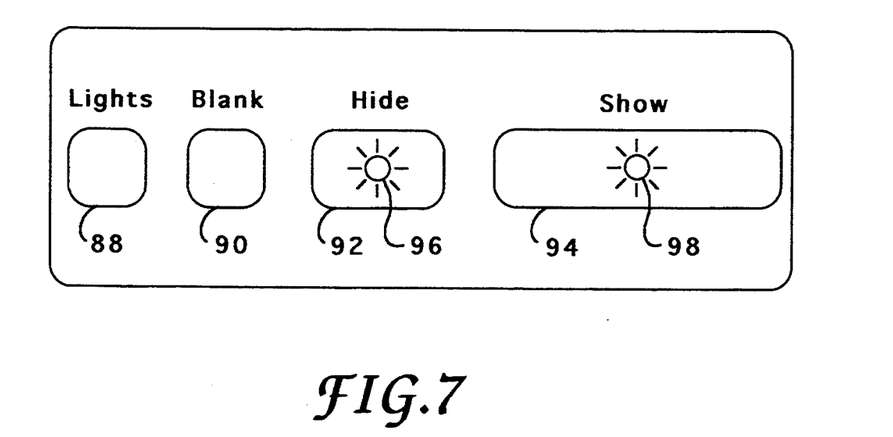
FIG. 7 is a top plan view of the keyboard used with the reader of FIG. 1.

After checking any new card placed in reader 10, processor 38 returns the program flow to step 70. If no other card has been placed in the reader, processor 38 next checks for any keyboard input (86). The presently preferred form of keyboard be is shown in FIG. 7. It includes a "Lights" button 88, a "Blank" button 90, a "Hide" button 92 and a "Show" button 94. "Lights" button 88 is used to activate light 21, which can be directly connected, or controlled through processor 38. "Blank" button 90 is depressed when the user wishes to temporarily blank the device which is displaying the graphic image associated with card 16 (a device such as a liquid crystal display panel on an overhead projector). "Hide" button 92 has an associated annunciator 96, and is used to blank out or remove portions of the displayed graphic image which have previously been revealed by use of "Show" button 94. "Show" button 94 also has an associated annunciator 98, and is used to reveal additional portions of a graphic image, such as a series of statements or "bullet" points which are to be sequentially displayed. Those skilled in the art will appreciate that the latter three functions are just a sampling of many different control signals which may be associated with a given image. Other exemplary functions include animation, branching to related images, scrolling and other screen effects, etc. As noted above, the IRN may include a trailing byte for downloading such presentation information. The binary code in the fifth (trailing) byte is associated with such external data stored or accessed by host computer 48.

Each of the buttons 90–94 are connected to processor 38. When "Blank" button 90 is depressed, processor 38 toggles a control bit in the subsequent poll signal to indicate whether the image should be displayed or blanked (100). When this poll signal is received by host computer 38, the computer blanks the display if the image was previously being shown, or restores the display if the image was previously blank.

When "Hide" button 92 is depressed, processor 38 first checks the IRN's fifth-byte display code to confirm that the IRN presently being displayed is a multiple-sequence image. The display code value must be 1 or more, or else depression of the button is ignored (a zero value for the reveal code indicates that the image does not have any reveal sequences). If the display code indicates multiple images, processor 38 checks the state of the image, i.e., the present position in the reveal sequence. If processor 38 finds that one or more sequences have already been revealed, then it sets several control bits in the subsequent poll signal (100) to an appropriate value (the reveal index) and, if the hiding step results in the original image (where no further hiding is possible), then annunciator 96 built into button 92 is de-energized. When this poll signal is received by host computer 38, the computer conceals the last image in the reveal sequence. If processor 38 finds that the original image is being displayed with no revealed sequences, then depression of "Hide" button 92 is ignored by processor 38 and the control bits are not modified.

When "Show" button 94 is depressed, processor 38 similarly checks the IRN's fifth-byte display code to confirm that the IRN presently being displayed is a multiple-sequence image. If the display code indicates multiple images, processor 38 examines the present position in the reveal sequence. If processor 38 finds that one or more sequences have not yet been revealed, then it sets the appropriate reveal index in the poll signal (100) and, if the reveal step results in the last image sequence (where no further revelation is possible), then annunciator 98 built into button 94 is de-energized. When this poll signal is received by host computer 38, the computer reveals the next sequence in the image. If the final image is being displayed with all sequences revealed, then depression of "Show" button 94 is ignored by processor 38 and the reveal index is not modified.

Annunciators 96 and 98 are initialized (either turned on or off) when a card's IRN is validated (68), based on the IRN's reveal count (the fifth byte in the IRN record).

No control bits are set when "Lights" button 88 is depressed.

Returning now to FIG. 5, after the control bits have been set in accordance with a valid keyboard entry (or if no valid entry was made), processor 38 issues a poll signal to transmitter 44. In the present embodiment, the signal includes seven control bits, five for the reveal index, one for an animation flag, and one for the display blank flag. After the poll signal is sent (102), processor 38 activates receiver 46 to analyze any response from host computer 48. If no response is received after a predetermined time (104), program flow moves to step 60. If a NAK is received, or if a response has an invalid format, the poll signal is re-sent (106). In the present embodiment, a valid format for a host status response from host computer 48 includes five bits: an image present flag, set to 1 when the image is fully displayed; an animation flag, set to 1 when any animation is turned on or completely finished (this flag is not used in the present embodiment); a reveal index match, set to 1 when the host's reveal index matches the poll signal's reveal index and the latest hide/show is completely finished; a blank flag, set to 1 when the display is completely blanked; and a PID flag, set to 1 if the current presentation loaded on host computer 48 has been downloaded to reader 10, i.e., if the current PID has been sent as in step 62. If the host status response information appears anomalous (for example, if the PID sent flag is zero), then processor 38 assumes an error and re-initializes the presentation by moving program control to step 56. If the host status response information properly maps to the current reader status information (108), this confirms that the host has executed the proper display commands and is waiting for the next command from transmitter 44. Those skilled in the art will recognize this bi-directional protocol as a master/slave protocol wherein reader 10 is the master and host computer 48 is the slave.

During extended periods wherein no new card 16 is placed in slot 14 and no buttons are depressed, the poll signal is sent about ten times every second. Host transceiver should be programmed to respond to receiver 46 within a certain time frame to ensure that its response is received prior to the reader's timeout. The host status response should also be sufficiently prompt so that transceiver 50 can complete the response prior to the next poll signal from transmitter 44. At any time during use of reader 10, if processor 38 detects that the battery power is low, it energizes annunciator 40d. Those skilled in the art will appreciate that aural annunciators could be used instead of lights, e.g., a speaker with different beeping patterns for different error conditions.

Figure 8:
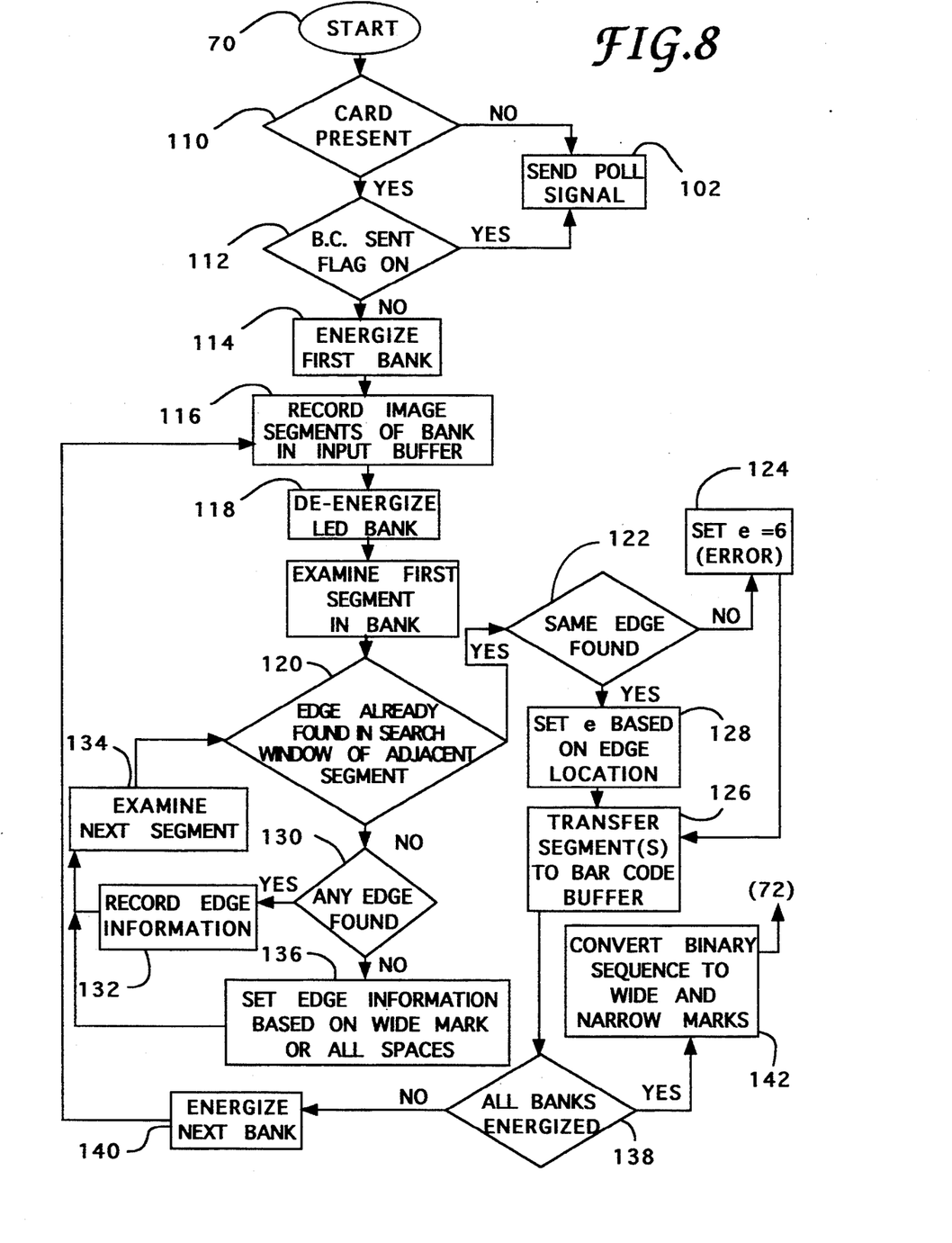
FIG. 8 is a flow chart depicting the bar code reconstruction algorithm of the present invention.
Figure 9:
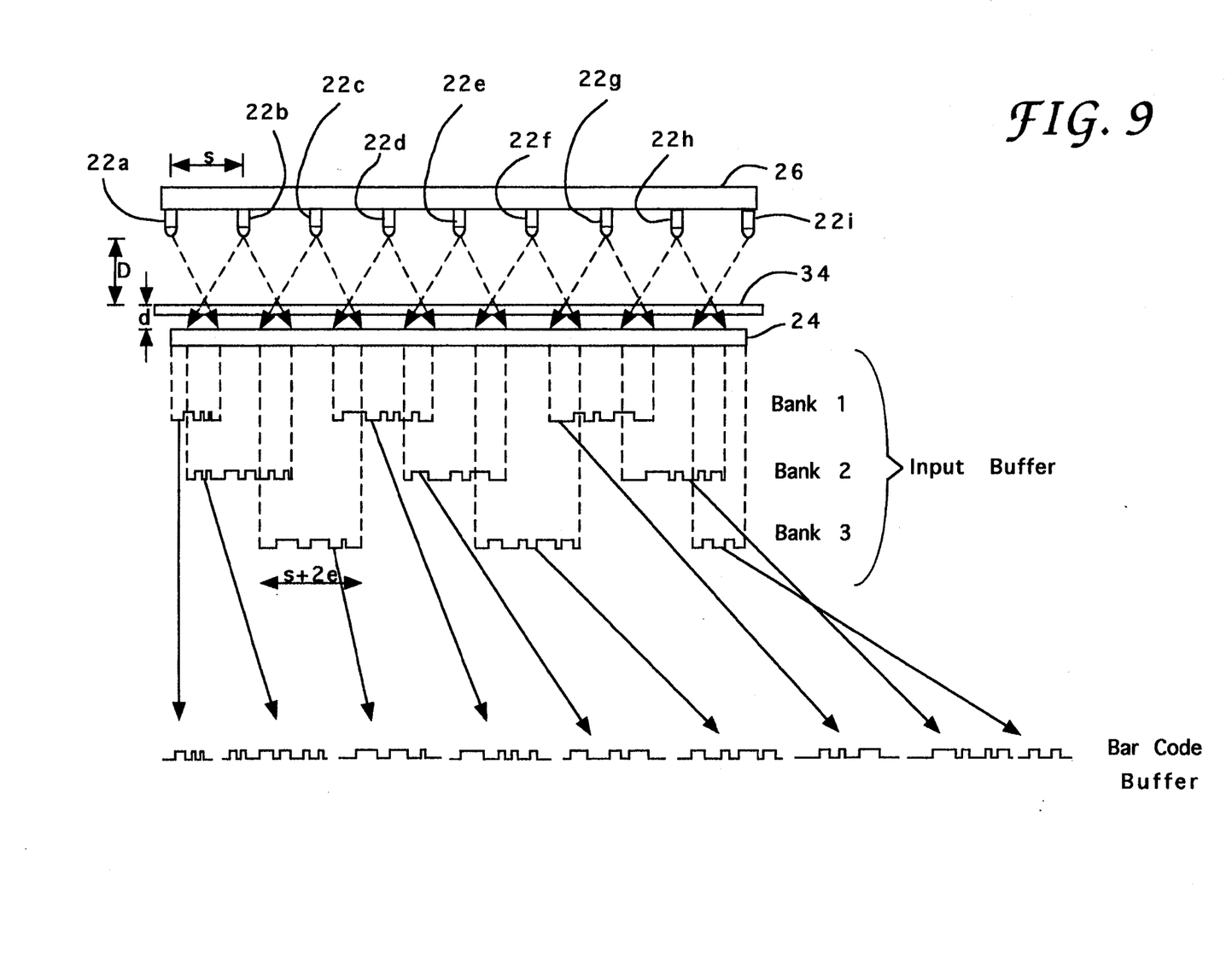
FIG. 9 is a chart representing the steps in reconstructing an electronic image corresponding to an optical bar code according to the present invention.

The manner in which processor 38 senses a new card and decodes the optical bar code is explained with reference to FIGS. 8 and 9. This may be accomplished several ways. For example, the prior art card reader (U.S. Pat. No. 5,233,171) uses proximity sensors. In the present embodiment, however, processor 38 first determines if any card present in slot 14 has anything like a bar code (110). The presence and validity of a card is determined by sampling any code located between light source array 22 and sensor 24. Two of the LED's are energized and the corresponding sections of sensor 24 are examined. It is preferable to energize two LED's which are widely separated, and yet not the LED's at the very ends of the array; consequently, LED's 22b and 22h are chosen. If no bar code is found, processor 38 assumes that no card is present and proceeds with the poll signal (102), consistent with FIG. 5. If any series of discernable marks and spaces (a bar code) are found, processor 38 assumes a card is present, and next checks the "bar code sent" flag, an internally stored parameter (112). This flag is turned on in the "YES" branch of step 84 of FIG. 5 after a bar code's validity has been confirmed and the associated index number has been transmitted to host computer 48. If the "bar code sent" flag is on, processor 38 assumes that the index number for this card has already been transmitted to host computer 48, and so returns program control to step 102 (polling). With this approach, it is conceivable that, if two cards were switched very quickly, processor 38 would not realize that a new card was present. This is very unlikely, however, since the presence of a card (step 110) is checked prior to every poll signal, and usually occurs about ten times per second. If the "bar code sent" flag is off, processor 38 proceeds with a full scan of the bar code, beginning with the first bank of LED's (114).

While LED's 22a–22i are generally point sources, their relative proximity can cause multiple shadows to appear on the surface of sensor 24, resulting in erroneous reconstruction of the bar code. Therefore, for the full scan of the bar code, the array of light sources is divided into a plurality of banks, wherein a light source in a given bank is not immediately adjacent any other light source in the same bank, i.e., there are intervening light sources from other banks. In the preferred embodiment, nine LED's are used, divided into three banks. The first bank includes LED's 22a, 22d and 22g; the second bank includes LED's 22b, 22e and 22h; and the third bank includes LED's 22c, 22f and 22i. In this manner, when all of the LED's in a given bank are energized, any overlapping shadows on sensor 24 are negligible. It will be appreciated that other bank combinations are allowable, e.g., only two banks each using every other LED.

As previously mentioned, sensor 24 has a plurality of pixels along its length. Processor 38 is programmed to divide these pixels into groups or image segments defined by the spacing between LED's 22a–22i. The first segment is slightly longer than half of the distance s between adjacent LED's. Subsequent segments are slightly larger than s and extend between successive midpoints of the LED array; the last segment is equal in length to the first segment. The segments are slightly longer than s (or s/2) due to parallax distortion, and the expansion value e may be expressed as:

$$e = ds/2D,$$

where d is the distance from the bar code surface to sensor 24,

D is the distance from the bar code surface to the LED array, the segment length for the first and last segments is $s/2 + e$, and the segment length for all interior segments is $s + 2e$.

This equation assumes that the index of refraction of plates 30 and 32, as well as that of transparent substrate 34, is 1.

The distances s and e can be measured in terms of the equivalent number of pixels based on the width of the pixels in sensor 24. The presently used sensor has 512 pixels and is about 6.4 cm long; s is about 64 pixels, and e is typically about 5 pixels (determined empirically), based upon the particular geometry of slot 14 and plates 30 and 32, and upon the index of refraction of the plates and the transparent substrate. Knowing s and e, processor 38 can easily combine the segments to reconstruct an electronic image of the bar code in a bar code buffer. Note that the segments need not be loaded into the bar code buffer in physical order, due to the banking of the LED's. In other words, the image segments are loaded in the following order, where 1 is the first segment at LED 22a and 9 is the last segment at LED 22i: 1, 4, 7, 2, 5, 8, 3, 6, 9.

The pixels of MOS sensor 24 produce an analog signal which is digitized by a discriminator to produce a value of zero (a mark) or one (a space); the mark/space polarity is arbitrary. These values may be fed into an input buffer in processor 38 and, when grouped into a segment, define a portion of the electronic image of the bar code (116). After recording all image segments associated with the first bank, the LED's are de-energized (118). If the surface of the bar code 36 on window 34 is always at the proper location in slot 14 (based on presumed values of d and D), then these segments can simply be concatenated to reproduce the full bar code. Many conventional techniques may be used to thereafter decode the combined segments, depending upon the particular type of bar code. The present invention contemplates the use of a conventional "2-of-5" bar code wherein decimal numerals are represented by different combinations of five marks, two of the marks being wide and three being narrow (2.25:1 ratio). In the present embodiment, a narrow mark is about 0.5 mm (5 pixels) and a wide mark is about 1.1 mm (12 pixels). The bar code has eight such five-mark sets, for an eight-digit IRN, and also has start and stop sets.

While the foregoing algorithm is often satisfactory, it may produce errors if the surface of bar code 36 is not uniformly located along slot 14, such as if the transparent film forming window 34 has wrinkles. In this case, the ratio d/D changes and the presumed value of e is no longer valid, allowing adjacent image segments to overlap. The present invention solves this problem by taking advantage of the fact that, in the disclosed construction of reader 10, the effective width (in pixels) of a narrow mark in the bar code is greater than the overlap zone (in pixels). The range of actual values of e in the present construction of reader 10 is about 5–7 pixels, resulting in an overlap zone of ±2 pixels. Processor 38 searches near the adjacent overlap zones for two events (a rising edge or a falling edge) which match, i.e., are the same event. It has been empirically found that a search window of about 12 pixels, centered on the overlap zone, is optimal for seeking any edge. As used herein, the "rising" edge refers to a pixel having a space followed (to the right in FIG. 9) by a pixel having a mark, and the "leading" edge refers to a pixel having a mark followed by a pixel having a space, although these terms should not be construed in a limiting sense.

Processor 38 does not need to wait until all of the image segments are placed in the input buffer before examining the search windows. The leading and trailing search windows (12 pixels) of each of the segments may be examined as the segments are received (in the banked order given above). For example, if an edge is found in the (trailing) search window of the first segment (that portion of sensor 24 midway between LED's 22a and 22b), variables stored in the internal memory of processor 38 are set to indicate the presence of the edge, its location and its type (rising/falling). Later, when the second segment is being loaded into the input buffer (Bank 2), processor 38 checks to see if an edge was already found in the complementary search window (120), i.e., in the trailing portion of the first segment. This prior edge check may be carried out using an array of flags for each segment boundary. If the array indicates that an edge was already found at the boundary, then the same edge is searched for in the current overlap zone (122). Searching begins with a presumed e of 6 pixels. The search direction is determined by (i) the mark/space state at that point in the overlap zone, and (ii) the edge type (rising or falling), which was previously recorded in the complementary search window. It is possible that a match will not be found, for example, if the card 16 is moved during the scan, or due to weak marks or inconsistent light sources; in such a case e is arbitrarily set to 6 pixels (124) and the segment is placed in the bar code buffer based on this value (126). If an edge of the same type is found, the value of e for that specific segment boundary can be effectively calculated by comparing the location of the edge in the second segment with its location in the first segment (128). Once e is known for a given segment boundary, the image segment address in the input buffer can be appropriately shifted for placement of the segment in the bar code buffer (126).

If no edge has yet been found in a complementary search window, a search is performed to see if any edge can be found in the current search window (130). If one is found, the edge information (location, type) is stored for future reference (132), and the next segment is examined (134). It is possible that no edge will be found in an overlap zone; in the present embodiment, however, this would occur only if the overlap zone was occupied by a wide mark, or by all spaces. In either case, however, e may again be assumed to be 6 pixels, and "edge" information is recorded (136) as either no edge (for a wide mark), or as a space-to-mark edge (for all spaces). When the complementary search window is later examined (120), finding the "same" edge (122) corresponds to setting e to 6 pixels (128), and the segment is transferred to the bar code buffer (126). In the unusual case where all spaces were found in the original search window, but an edge is found in the complementary search window, e is reset prior to transferring to the bar code buffer, based on the edge location in the complementary search window.

After all of the image segments in a given bank have been placed in the bar code buffer, the next bank of LED's is energized, de-energized, and its segments examined (138). Once the full bar code has been electronically reconstructed, conventional means may be used to decode the value of the binary sequence. The present invention retains the technique described in U.S. patent application Ser. No. 07/861,067 for discriminating between wide and narrow marks (140). Spaces are irrelevant in a 2-of-5 bar code. Processor 38 then determines if the bar code has a valid IRN format (step 72 of FIG. 5) by first checking for the start and stop sequences at the beginning and end of the code. If present, the interior portion of the code is searched for eight sets of five marks each. If these marks are properly detected, each set is examined to see if it comports with the 2-of-5 encoding scheme and, if so, its decimal value (0–9) is determined and used to calculate the IRN, used in step 76. Those skilled in the art will appreciate that processor 38 may be programmed to recognize reversed start and stop sequences, and thus still properly read a card which has been placed in slot 14 backwards.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, many components shown in FIG. 4 could be eliminated or greatly simplified if reader 10 were directly connected (with copper wiring or optical fiber) to host computer 48 or, moreover, if host computer 48 were integrated with reader 10, and directly interfaced with the image storage device and the display. It is therefore contemplated that such modifications can be made without departing from the spirit or scope of the present invention as defined in the appended claims.

We claim:

1. An apparatus for scanning an optical code on a transparent portion of a substrate, comprising:
   a linear array of light sources grouped into a plurality of banks, a given bank having light sources which are non-adjacent;
   means for housing said array of light sources;
   optical sensor means mounted in said housing means, proximate said array of light sources, for generating electrical signals;
   means for removably retaining the substrate in said housing means with the transparent portion thereof located in an optical path between said array of light sources and said optical sensor means; and
   means for processing said electrical signals from said optical sensor means to produce an output signal corresponding to the optical code, said processing means including means for sequentially energizing said banks such that, when a particular light source is energized, any light source adjacent to said particular light source is de-energized.

2. The apparatus of claim 1 wherein said optical sensor means is also linear and is mounted parallel to said array of light sources.

3. The apparatus of claim 2 wherein said optical sensor means is a solid-state electronic component.

4. The apparatus of claim 1 wherein each of said light sources is a light-emitting diode.

5. The apparatus of claim 1 wherein each of said light sources approximates a point source of light.

6. The apparatus of claim 1 wherein:
   each of said light sources has an optical axis; and
   said light sources are mounted inside said housing means such that said optical axes are all generally parallel.

7. A data retrieval system utilizing the apparatus of claim 1, and further comprising:
   a host device having electronically stored, external data associated with the optical code; and
   means, electronically connected to said processing means, for transmitting said output signal to said host device and for receiving said external data.

8. The system of claim 7 wherein said external data includes a plurality of stored image reference numbers corresponding, respectively, to electronically stored graphic images, and wherein the apparatus further comprises:
   means for electronically receiving said stored image reference numbers from said host device;
   means for decoding the optical code on the substrate to produce a particular image reference number;
   annunciator means for indicating whether said particular reference number is equal to any of said stored image reference numbers; and
   means for electronically transmitting said particular image reference number to said host device if said particular image reference number is equal to any of said stored image reference numbers.

9. The system of claim 8 wherein the apparatus further comprises polling means for indicating whether said host device is properly communicating with the apparatus.

10. The system of claim 7 wherein said external data includes information relating to the visual presentation of a graphic image, and further comprising key means mounted on said housing means, and electrically connected to said processing means, for generating display control signals associated with said presentation information.

11. The apparatus of claim 1 wherein said processing means:
    electronically generates multiple image segments based on said electrical signals from said optical sensor means, one image segment for each of said sequentially energized banks of light sources;
    combines said multiple image segments to reconstruct an electronic image corresponding to the entire optical code; and
    decodes said reconstructed electronic image to yield said output signal.

12. An apparatus for electronically selecting one of a plurality of unique reference numbers located in one or more data segments electronically stored on a host device, the reference numbers having a known format, the apparatus comprising:
    means for receiving electronic signals from the host device;
    means for transmitting electronic signals to the host device;
    memory means for electronically storing the data segments;
    means for entering an input value corresponding to one of the reference numbers;
    an annunciator; and
    processing means, connected to said transmitting means, said receiving means, said memory means, said entering means and said annunciator, for
    issuing an initial request to said transmitting means for a value corresponding to the number of data segments to be downloaded,
    activating said receiving means to analyze any initial response from the host device,
    energizing said annunciator if no initial response is received after a predetermined time,
    repeating said initial issuing, activating and energizing steps unless said initial response corresponds to a valid value within a predetermined range,
    issuing one or more segment requests to said transmitting means, if said initial response corresponds to said valid value, one such segment request for each data segment represented by said valid value,
    activating said receiving means after each said segment request is issued, to analyze any segment response from the host device,
    repeating said segment issuing and activating steps if either no segment response is received within a predetermined time period or if said segment response does not conform to said known format,
    storing each of the data segments in said memory means,
    creating an electronic index having a plurality of index numbers associated, respectively, with the reference numbers in the data segments,
    sending one of said index numbers to said transmitting means when said input value corresponds to a respective one of said reference numbers, and
    intermittently polling the host device through said receiving and transmitting means for a status response, and energizing said annunciator if no status response is received within a predetermined time.

13. The apparatus of claim 12, further comprising a second annunciator, said processing means energizing said second annunciator if said input value does not correspond to any stored data segment.

14. The apparatus of claim 12 wherein the data segments include a plurality of bits, and said processing means:
    issues a checkum request to said transmitting means;
    activates said receiving means after said checksum request is issued to record any checksum response from the host device;
    calculates a binary checksum equal to the sum of all bits in all of the data segments; and
    repeats each of the foregoing steps and each of the processing steps of claim 12 if said checksum is not equal to said recorded checksum response.

15. The apparatus of claim 12, further comprising means for providing a wireless, electronic interface between the host device and said receiving and transmitting means.

16. An electronic presentation system comprising:
    a host computer having memory means for electronically storing
    a presentation ID number,
    a plurality of graphic images associated with said ID number, and
    a plurality of image reference numbers corresponding, respectively, to said graphic images;
    means connected to said host computer for displaying said graphic images;

at least one preview card having machine-readable information corresponding to a particular image reference number; and a reader for scanning said preview card, said reader having a housing for removably retaining said preview card;

means for electronically receiving said ID number and said stored image reference numbers from said host computer, processing means for decoding said machine-readable information on said preview card when said preview card is retained in said housing, to produce said particular image reference number, annunciator means for indicating whether said particular reference number is equal to any of said stored image reference numbers, means for electronically transmitting said particular image reference number to said host system if said particular image reference number is equal to any of said stored image reference numbers, and polling means for indicating whether said host computer is properly communicating with said reader.

17. The system of claim 16 wherein said memory means of said host computer also stores information relating to the visual presentation of a graphic image, and further comprising key means mounted on said housing, and electrically connected to said processing means, for generating display control signals associated with said presentation information.

18. A data retrieval system comprising:

a host device having electronically stored, external data including a plurality of stored image reference numbers corresponding, respectively, to electronically stored graphic images; and an apparatus for scanning an optical code on a transparent portion of a substrate, the apparatus including a linear array of light sources, means for housing said array of light sources, optical sensor means mounted in said housing means, proximate said array of light sources, for generating electrical signals, means for removably retaining the substrate in said housing means with the transparent portion thereof located in an optical path between said array of light sources and said optical sensor means, means for processing said electrical signals from said optical sensor means to produce an output signal corresponding to the optical code, means, electronically connected to said processing means, for transmitting said output signal to said host device and for receiving said external data, means for electronically receiving said stored image reference numbers from said host device, means for decoding the optical code on the substrate to produce a particular image reference number, annunciator means for indicating whether said particular reference number is equal to any of said stored image reference numbers, and means for electronically transmitting said particular image reference number to said host device if said particular image reference number is equal to any of said stored image reference numbers.

19. A data retrieval system comprising:

a host device having electronically stored, image reference numbers corresponding, respectively, to electronically stored graphic images; and a reader for scanning an optical bar code printed on a transparent portion of a card, the reader having a housing, a linear array of approximately point light sources located in said housing, each of said light sources having an optical axis and being mounted inside said housing such that said optical axes are all parallel, a linear, solid-state, optical sensor mounted in said housing, proximate said array of light sources and extending along a direction perpendicular to said optical axes of said light sources, said optical sensor generating electrical signals in response to optical radiation, means for removably retaining the card in said housing with the transparent portion thereof located between said array of light sources and said optical sensor, means for processing said electrical signals from said optical sensor to produce an output signal corresponding to the optical bar code, means for electronically receiving said stored image reference numbers from said host device, means for decoding the optical bar code on the card to produce a particular image reference number, annunciator means for indicating whether said particular reference number is equal to any of said stored image reference numbers, means for electronically transmitting said particular image reference number to said host device if said particular image reference number is equal to any of said stored image reference numbers, and polling means for indicating whether said host device is properly communicating with the reader.

20. An apparatus for scanning an optical code on a transparent portion of a substrate, comprising:

a generally linear array of light sources;

means for housing said array of light sources;

optical sensor means mounted in said housing means, proximate said array of light sources, for generating electrical signals;

means for removably retaining the substrate in said housing means with the transparent portion thereof located in an optical path between said array of light sources and said optical sensor means, said retaining means, said sensor means and said light sources being arranged such that an image of the optical code is directly formed by a shadow cast onto said sensor means; and means for processing said electrical signals from said optical sensor means to produce an output signal corresponding to the optical code.

* * * * *